(12) United States Patent
Oda

(10) Patent No.: US 8,344,593 B2  
(45) Date of Patent: Jan. 1, 2013

(54) VIBRATION TYPE DRIVING APPARATUS

(75) Inventor: Yuki Oda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 13/052,921

(22) Filed: Mar. 21, 2011

(65) Prior Publication Data

US 2011/0234050 A1    Sep. 29, 2011

(30) Foreign Application Priority Data

Mar. 23, 2010   (JP) ................. 2010-067003

(51) Int. Cl.
    *H01L 41/08* (2006.01)
(52) U.S. Cl. .............. 310/323.02; 310/323.12
(58) Field of Classification Search ............. 310/323.02, 310/323.12, 323.16
    See application file for complete search history.

(56) References Cited

U.S. PATENT DOCUMENTS

| | | | | |
|---|---|---|---|---|
| 7,834,523 B2* | 11/2010 | Higashionji et al. | ........... | 310/345 |
| 2005/0242686 A1* | 11/2005 | Yamamoto et al. | ...... | 310/323.02 |
| 2006/0186760 A1* | 8/2006 | Sakano | ..................... | 310/323.02 |
| 2006/0250048 A1* | 11/2006 | Moteki et al. | ............ | 310/323.02 |
| 2007/0138910 A1 | 6/2007 | Ganor et al. | | |
| 2008/0238249 A1* | 10/2008 | Takahashi et al. | ............ | 310/317 |
| 2009/0009033 A1* | 1/2009 | Voigtlander et al. | ..... | 310/323.02 |

FOREIGN PATENT DOCUMENTS

| | | |
|---|---|---|
| JP | 2004-320846 A | 11/2004 |
| JP | 2007-524339 A | 8/2007 |
| JP | 2008-167594 A | 7/2008 |
| JP | 2009-225503 A | 10/2009 |

* cited by examiner

*Primary Examiner* — Mark Budd
(74) *Attorney, Agent, or Firm* — Canon USA Inc IP Division

(57) ABSTRACT

A vibration type driving apparatus is provided, in which a plurality of vibration members include rotation units that are formed so as to be rotatable around respective rotation axes that are parallel to respective directions of forces generated by elliptical movements; in which any vibration member that is positioned in a range where an angle between a direction of movement of a moving member and the corresponding rotation axis is greater than a predetermined angle is tilted by the rotation unit, and vibration mode for push-up moving is generated at the any vibration member; and in which the elliptical movement of any vibration member that is positioned in a range where the angle is less than the predetermined angle causes the moving member to move.

8 Claims, 14 Drawing Sheets

MODE FOR FORWARD MOVING

VIBRATION FOR PUSH-UP MOVING

VIBRATION TYPE DRIVING APPARATUS

BACKGROUND OF THE INVENTION

1. Field of the Invention

The present invention relates to a vibration type driving apparatus that causes a moving member that is in contact with a plurality of vibration members to move in a plurality of different directions. In particular, the present invention relates to a vibration type driving apparatus that is suitable for use in a driving table or a mechanism for correcting motion blur of an optical apparatus, such as a camera and a binocular.

2. Description of the Related Art

Hitherto, the following driving apparatus has been proposed in Japanese Patent Laid-Open No. 2009-225503.

That is, the driving apparatus includes a plurality of vibration members, a securing section, and a moving member. The vibration members are combinations of elastic members and electro-mechanical energy conversion elements. The securing section holds the plurality of vibration members. The moving member contacts the plurality of vibration members, and is frictionally driven in a plurality of different directions.

Accordingly, the driving apparatus is formed so that the moving member that contacts the plurality of vibration members can move in the plurality of different directions.

Such a driving apparatus will be described in more detail with reference to FIGS. 18A and 18B.

In FIG. 18A, vibration members 101 to 103 generate driving forces in different directions (that is, in the directions of arrows M11 to M13), and cause a moving member 104 to move.

These driving forces act upon the moving member 104 as a combination of forces vectors, causing the moving member 104 to move in the direction of arrow Ms shown in FIG. 18B.

Although, in FIGS. 18A and 18B, the example in which the vibration members generate driving forces in the directions of arrows M11 to M13 so that the moving member moves in the direction of arrow Ms is illustrated, it is possible to move the moving member in any direction on the basis of the combination of force vectors of the driving forces that are generated by the respective vibration members.

PCT Japanese Translation Patent Publication No. 2007-524339 proposes a positioning apparatus that can drive a moving member in a plurality of different directions using a plurality of vibration members, and a method of reducing a load.

In PCT Japanese Translation Patent Publication No. 2007-524339, when the moving member is driven in the plurality of directions using the plurality of vibration members, a load applied to the vibration members is reduced in the following way.

In order for at least one of the plurality of vibration members for moving the moving member to apply a parallel force to a surface of the moving member, and in order for at least one of any of the other vibration members to apply a vertical vibration (a vibration mode for push-up moving) to the surface of the moving member, these are controlled at the same time, to reduce load.

When a period of vertical vibration is controlled, and the parallel force is applied to the moving member, the vibration member that applies the vertical vibration is moved away from the moving member.

In Japanese Patent Laid-Open No. 2009-225503, when, for example, a vibration member that does not apply a force to the moving member and that is disposed in a direction orthogonal to a vibration member that applies a force in a direction of movement of the moving member is in contact with the moving member, this acts as a load on the movement of the moving member.

In contrast, in PCT Japanese Translation Patent Publication No. 2007-524339, a load on the movement of the moving member is reduced by causing the vibration members other than the vibration member that applies a force that is parallel to the surface of the moving member for moving the moving member to only apply vertical vibration to the surface of the moving member.

However, when only the vertical vibration is applied to the moving member, the vibration members and the moving member cannot be completely out of contact with each other. Therefore, it is difficult to completely eliminate the load. In addition, even with the structure of an embodiment discussed in PCT Japanese Translation Patent Publication No. 2007-524339 (in which, when a timing of applying only the vertical vibration to the surface of the moving member is controlled, and a parallel force is applied to the surface of the moving member, the vibration member that applies the vertical vibration to the surface of the moving member is moved out of contact with the moving member), it is difficult to constantly keep them out of contact with each other.

That is, in such a structure, the state of contact of the moving member with the vibration members depends upon, for example, the shapes of contact surfaces, vibration amplitudes of the vibration members, the mass of the moving member, the rigidities of the contact surfaces between the moving member and the vibration members. Accordingly, it is difficult to constantly keep them out of contact with each other.

Therefore, even in PCT Japanese Translation Patent Publication No. 2007-524339, contact between the moving member and the vibration member that applies a vertical vibration to the surface of the moving member becomes a load on the movement of the moving member.

SUMMARY OF THE INVENTION

The present invention provides a vibration type driving apparatus that makes it possible for all vibration members to serve as force generating sources for moving a moving member without the vibration members becoming a load on a movement of the moving member regardless of the direction of movement of the moving member, when forming the vibration type driving apparatus that moves the moving member in contact with the vibration members in a plurality of different directions.

A vibration type driving apparatus includes a plurality of vibration members, each including at least an electro-mechanical energy conversion element and a contact member and being formed so as to be capable of generating an elliptical movement at the corresponding contact member by combining a vibration mode for forward moving and a vibration mode for push-up moving, the vibration mode for forward moving being primarily a vibration that displaces the contact member in a direction parallel to a surface of the corresponding electro-mechanical energy conversion element, the vibration mode for push-up moving being primarily a vibration that displaces the contact member in a direction perpendicular to the surface of the corresponding electro-mechanical energy conversion element. At least two of the plurality of vibration members are disposed at positions where directions of forces generated by the elliptical movements differ from each other, and the elliptical movements cause a moving member in contact with the vibration members through the contact members of the vibration members to move in a plurality of different directions. The plurality of vibration members include rotation units that are formed so as to be rotatable around respective rotation axes that are parallel to the respective directions of the forces generated by the elliptical movements. Any vibration member that is positioned in a range where an angle between a direction of movement of the moving member and the corresponding rotation axis is greater than a predetermined angle is tilted by the rotation unit, and the vibration mode for push-up moving is generated at the any vibration member. The elliptical movement of any vibration member that is positioned in a range where the angle between the direction of movement of the moving member and the corresponding rotation axis is less than the predetermined angle causes the moving member to move.

The present invention provides a vibration type driving apparatus that makes it possible for all vibration members to serve as force generating sources for moving a moving member without the vibration members becoming a load on a movement of the moving member regardless of the direction of movement of the moving member, when forming the vibration type driving apparatus that moves the moving member in contact with the vibration members in a plurality of different directions.

Further features of the present invention will become apparent from the following description of exemplary embodiments with reference to the attached drawings.

BRIEF DESCRIPTION OF THE DRAWINGS

FIGS. 17B-1 and 17B-2 illustrate a principle of generating elliptical movements as a result of combining different standing-wave vibrations based on two bending vibration modes in the present invention.

DESCRIPTION OF THE EMBODIMENTS

The present invention will be described with reference to embodiments below.

First Embodiment

In a first embodiment, an exemplary structure of a vibration type driving apparatus, to which the present invention is applied, that moves a moving member in a plurality of different directions will be described with reference to FIGS. 1 to 2B.

Figure 2A:
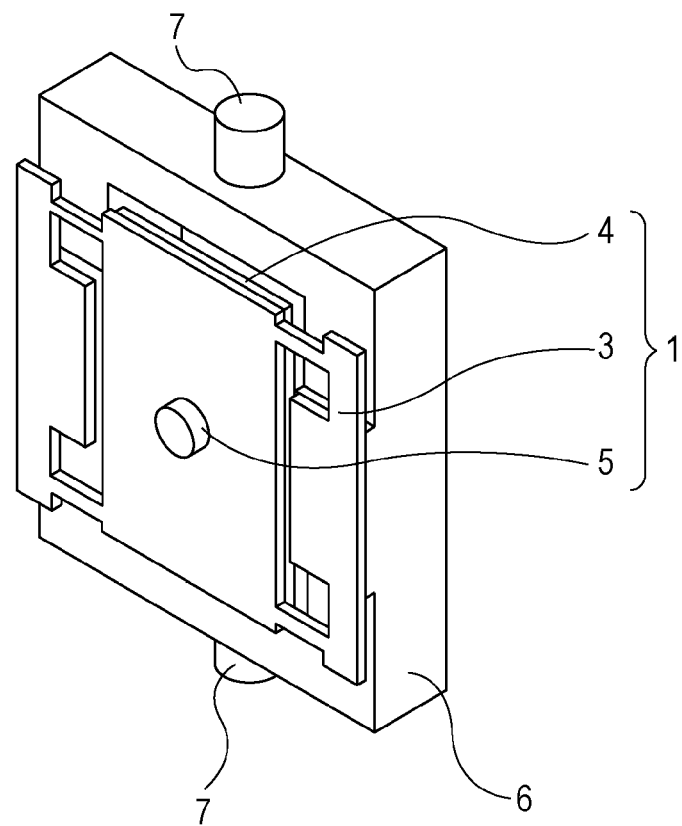
FIGS. 2A and 2B each show the structure of a holding unit and a vibration member of the vibration type driving apparatus in the first embodiment of the present invention.

FIG. 2A is a perspective view of a vibration member and a holding unit thereof in the first embodiment. FIG. 2B is a side view of the vibration member and the holding unit thereof in the embodiment.

Figure 1:
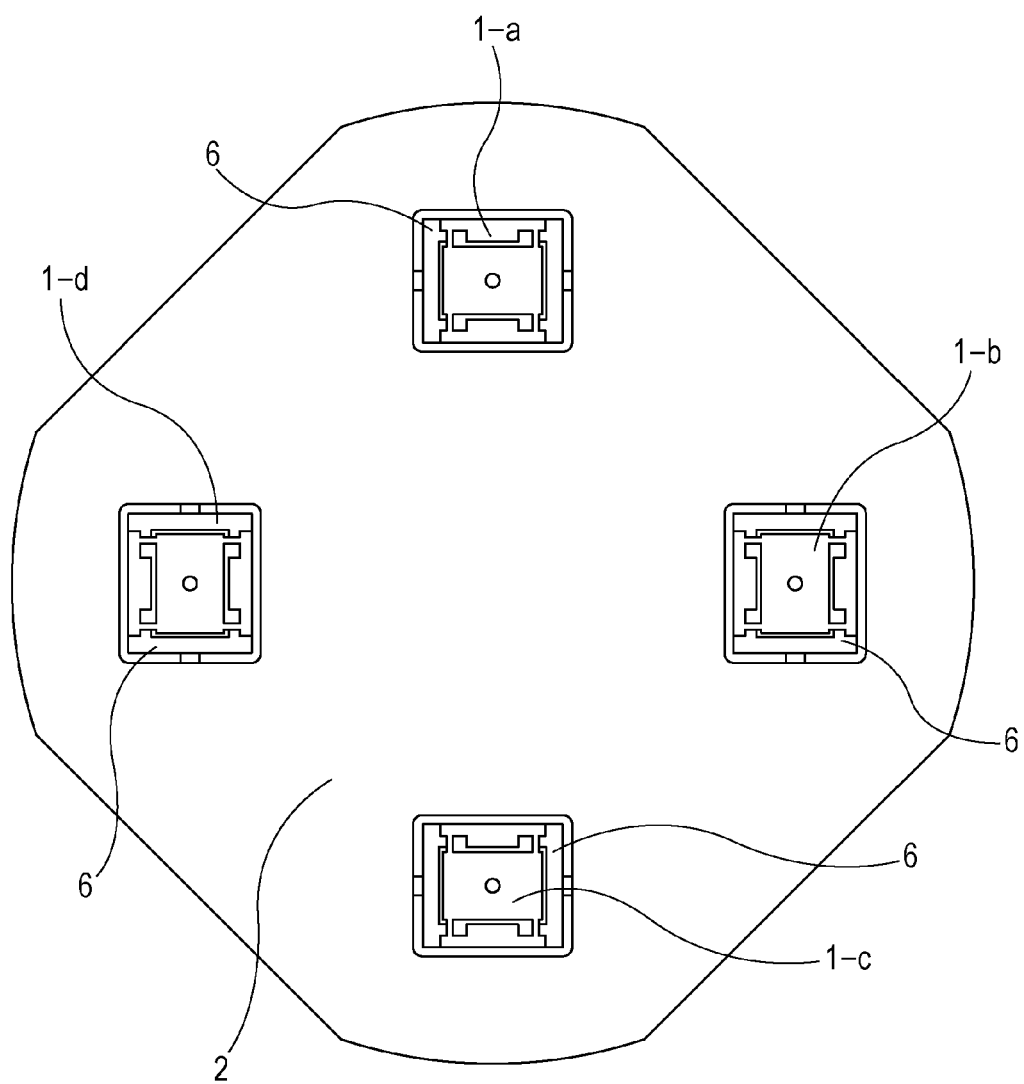
FIG. 1 shows a base and an arrangement of vibration members of a vibration type driving apparatus that moves a moving member in a plurality of different directions in a first embodiment of the present invention.

In FIG. 1, vibration members 1 (1-*a*, 1-*b*, 1-*c*, and 1-*d*) correspond to vibration members in the embodiment. Reference numerals 6 denote vibration-member supporting units to which the vibration members 1 are secured. Reference numeral 2 denotes a base that supports the vibration-member supporting units 6.

Figure 2B:
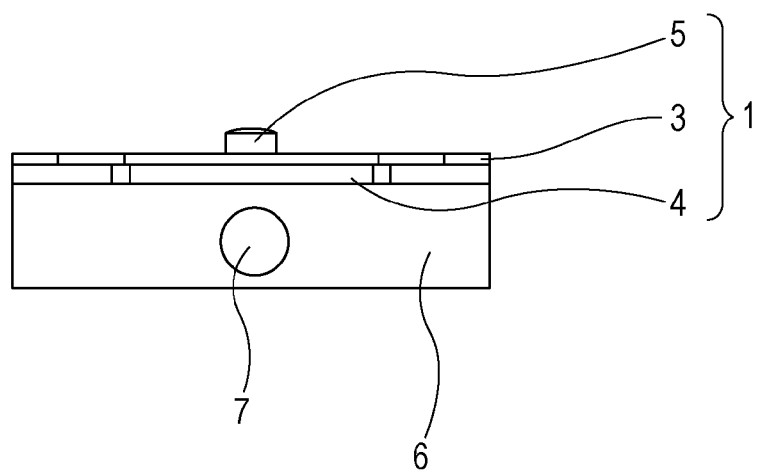

In each of FIGS. 2A and 2B, the vibration member 1 includes an elastic plate 3, an electro-mechanical energy conversion element 4, and a projection 5. The vibration member 1 is secured to the vibration-member holding unit 6. The vibration-member holding unit 6 is supported by the base 2 so as to be rotatable through a shaft 7 with the shaft 7 serving as an axis.

Figure 17A:
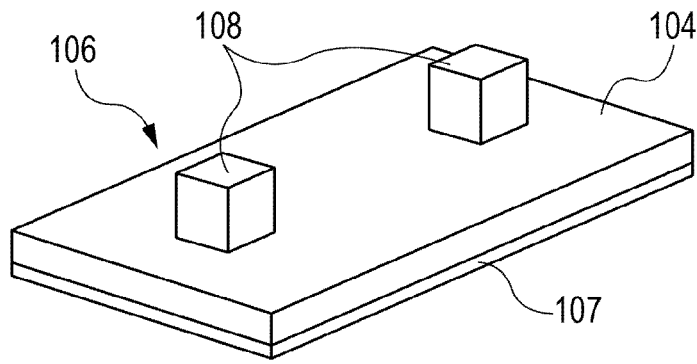
FIG. 17A shows a basic structure of a vibration member in the present invention.

Here, a basic driving structure of a vibration member will be simply described. FIG. 17A shows a basic structure of a vibration member similar to those mounted in the embodiment.

In the embodiment, one projection is provided. However, the driving principle is similar. As shown in FIG. 17A, a plurality of projections may be disposed. However, members other than such projections may be used as long as they form contact members.

A method of driving them is discussed in detail in, for example, Japanese Patent Laid-Open No. 2004-320846.

Here, a principle that allows elliptical movements to be generated as a result of combining different standing-wave vibrations based on two bending vibration modes will be described.

Figures 1, 17B:
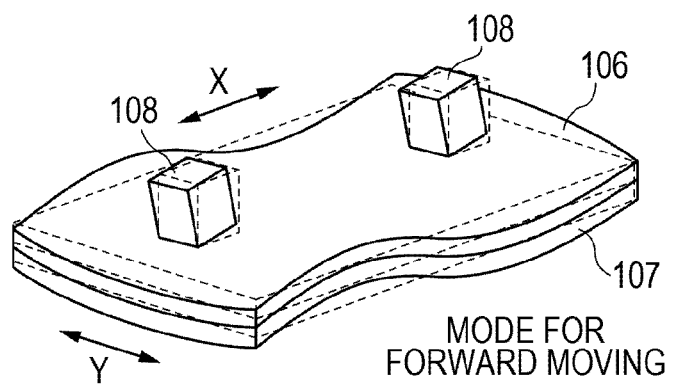
Figures 2, 17B:
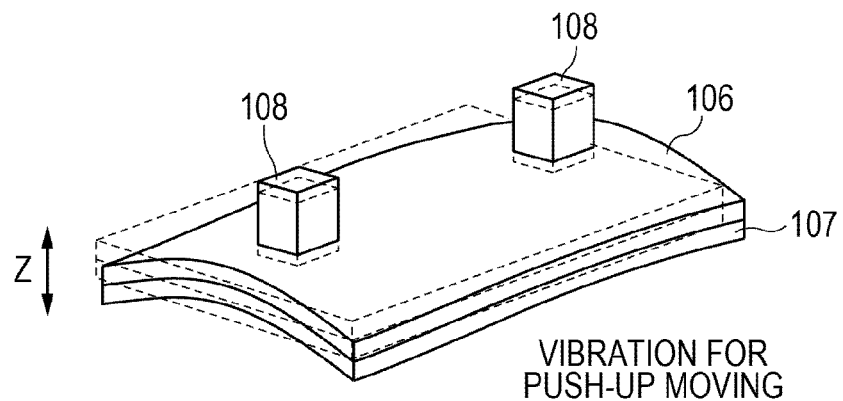
Figure 18A:
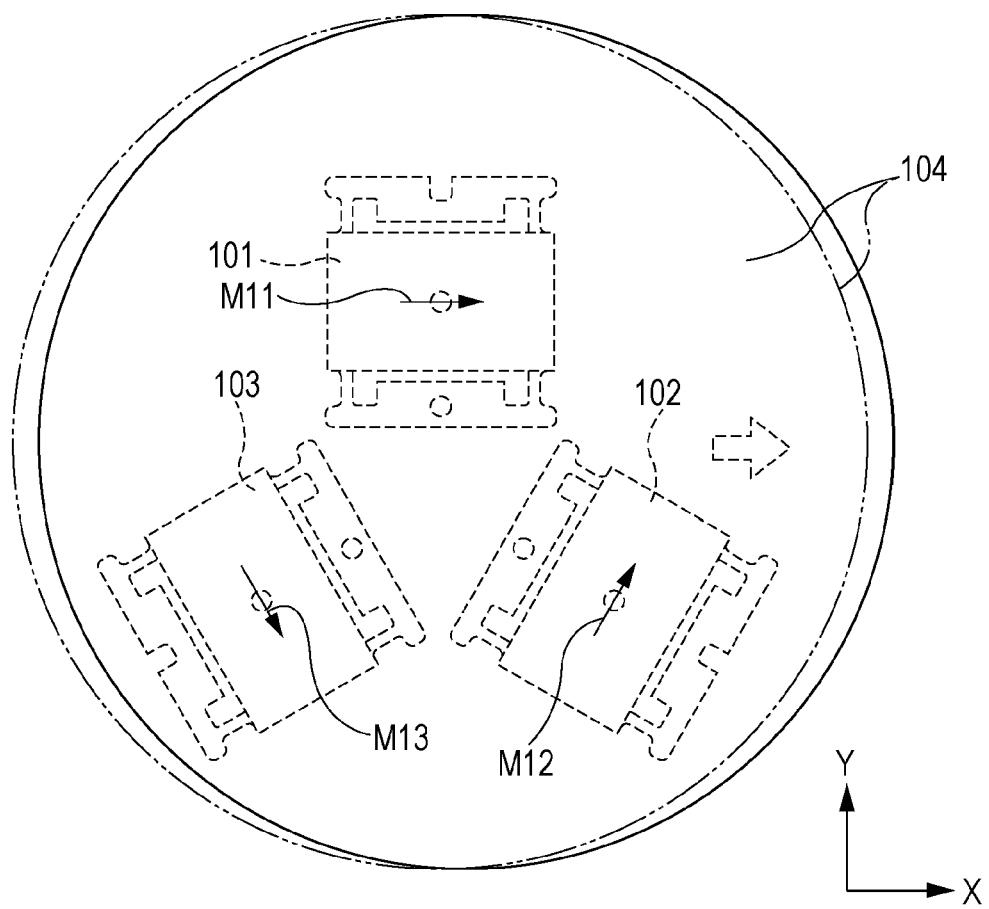
FIGS. 18A and 18B each show a driving principle of a vibration type driving apparatus that moves a moving member in a plurality of different directions in Japanese Patent Laid-Open No. 2009-225503.
Figure 18B:
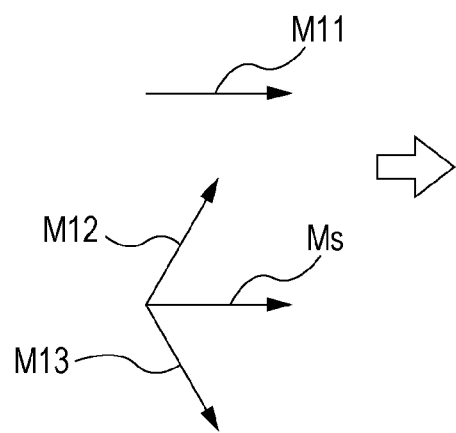

FIGS. 17B-1 and 17B-2 show the two bending vibration of different standing-wave vibrations of a vibration member.

The vibration mode in FIG. 17B-1 is one of the two bending vibration modes, that is, a vibration mode for forward moving.

The vibration mode for forward moving corresponds to a secondary bending movement in long-side directions (that is, the directions of a double-headed arrow X) of a rectangular vibration member 106, with three nodes that are parallel to short-side directions (that is, the directions of a double-headed arrow Y) being provided.

Here, projections 108 are disposed near positions where nodes are provided in a vibration mode for forward moving, and perform reciprocating movements in the directions of the double-headed arrow X (that is, in directions parallel to a plane where an electro-mechanical energy conversion element is adhered to an elastic member) as a result of the vibration mode for forward moving.

The vibration in FIG. 17B-2 is the other one of the two bending vibrations, and is called vibration mode for push-up moving.

The vibration mode for push-up moving corresponds to a primary bending movement in the short-side directions (that is, the directions of the double-headed arrow Y) of the rectangular vibration member 106, with two nodes that are parallel to the long-side directions (that is, the directions of the double-headed arrow X) being provided. Here, the nodes in the vibration mode for forward moving and the nodes in the vibration mode for push-up moving are substantially orthogonal in an XY plane.

The projections 108 are disposed near positions where antinodes are provided in the vibration mode for push-up moving, and perform reciprocating movements in directions of a double-headed arrow Z (that is, in directions perpendicular to the plane where the electro-mechanical energy conversion element is adhered to the elastic member) as a result of the vibration mode for push-up moving.

By generating the vibration mode for forward moving and the vibration mode for push-up moving on the basis of a predetermined phase difference, an elliptical movement is generated at an end of each projection 108 as a result of combining different standing-wave vibrations. In addition, driving forces are applied in the directions of the double-headed arrow X shown in FIG. 17B-1 (that is, in the directions parallel to the plane where the electro-mechanical energy conversion element is adhered to the elastic member).

Figure 3A:
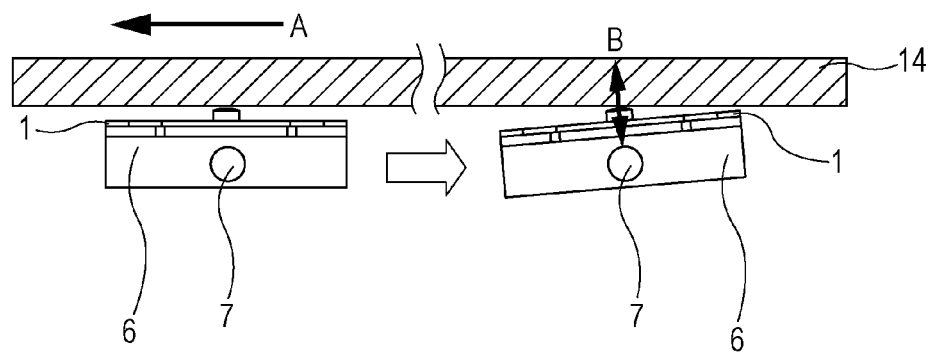
FIGS. 3A and 3B each show a state of rotation of vibration-member holding units of the vibration type driving apparatus in the first embodiment of the present invention.

In FIG. 3A, when a moving member 14 moves in the direction of arrow A, the vibration members 1 and the vibration-member supporting units 6 rotate around the shafts 7, serving as axes, and are tilted by friction force that is generated at contact surfaces between the projections 5 and the moving member 14. Then, with the vibration members being tilted, the vibration mode for push-up moving (in the directions of a double-headed arrow B) is generated at the vibration members 1.

Figure 3B:
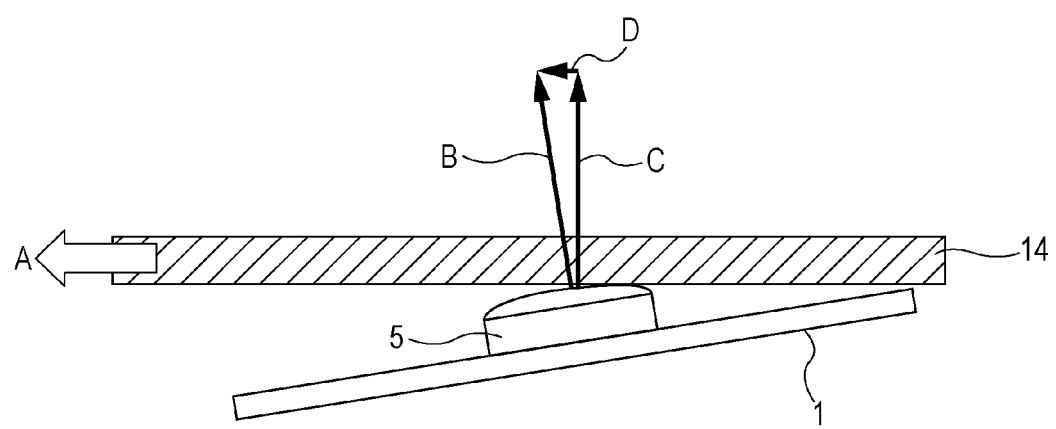

At this time, as shown in FIG. 3B, driving force in the direction of arrow B is generated at the projections 5. Then, the generated driving force is divided into a force vector in a direction that is perpendicular to a surface of the moving member 14 (that is, in a direction of arrow C) and a force vector in a direction that is parallel to the surface of the moving member 14 (that is, in a direction of arrow D).

Of these force vectors, the force vector that is perpendicular to the surface of the moving member 14 is not used to generate the driving force, and the force vector that is parallel to the surface of the moving member 14 acts upon the moving member 14 as the driving force that moves the moving member 14 in the direction of arrow A.

Accordingly, when, while the vibration members 1 are rotated and tilted, the push-up vibration is generated at the vibration members 1, it is possible to apply the driving force to the moving member 14 in the direction of arrow A in FIG. 3B.

At this time, in order to stabilize the state of contact of the projections 5 with the moving member 14, it is desirable for the end of each projection 5 to be an arcuate shape, and the radius of curvature thereof to be less than or equal to a distance from the center of each shaft 7 to the end of each projection 5.

By this, when the vibration members 1 rotate, the contact portions between the moving member 14 and the projections 5 are displaced towards the vibration members from the contact surfaces of the moving member 14. Therefore, when the vibration members 1 rotate, the projections 5 are pushed against the moving member 14, as a result of which a load is applied. Further, if the radius of curvature is made equal to the distance from the center of each shaft 7 to the end of its corresponding projection 5, when each vibration member 1 rotates, the distance between the center of each shaft 7 and the contact surface between each projection 5 and the moving member 14 does not change. Therefore, it is possible to maintain a certain contact state, and to obtain a stabilized driving force.

When the vibration members 1 are caused to rotate only when the shafts 7 and a direction of movement of the moving member are orthogonal to each other, a state in which an elliptical movement is generated at the projections without rotating any of the vibration members 1-*a* to 1-*d* shown in FIG. 1 exists.

In this state, when one aims at reducing the load only by making use of the push-up vibration as in the related art, similarly, at least one of the vibration members becomes a load.

Figure 4A:
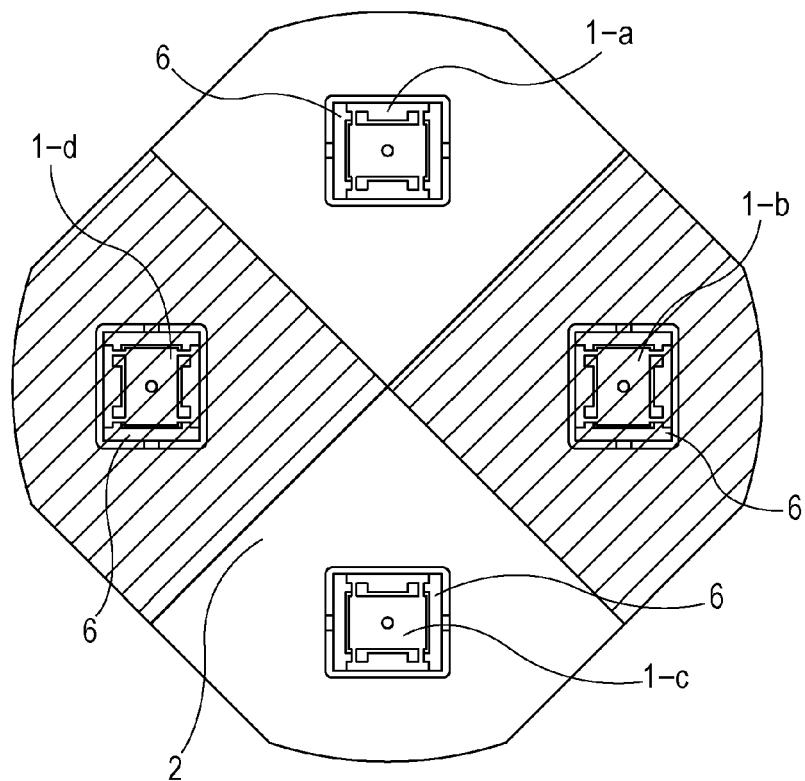
FIGS. 4A and 4B each show the relationship between rotations of the vibration members and the directions of movement of the moving member of the vibration type driving apparatus in the first embodiment of the present invention.

Therefore, when, in FIG. 4A, the moving member (not shown) is moved in ranges (indicated by shaded portions) in which angles between the direction of movement of the moving member and rotation axes of the vibration members 1-*b* and 1-*d* are greater than or equal to 45 degrees as viewed from the center of the base 2, the following driving method is used.

That is, the vibration members 1-*b* and 1-*d* are rotated to generate a push-up vibration at the projections of the respective vibration members 1-*b* and 1-*d*, whereas elliptical movements are generated at the projections without rotating the vibration members 1-*a* and 1-*c*.

In this state, since the vibration members 1-*b* and 1-*d* that are rotated when the moving member moves in the direction of the shaded portions act as driving forces on the moving member, the vibration members 1-*b* and 1-*d* do not act as loads on the movement of the moving member.

When the moving member is moved in a direction that is not the directions of the shaded portions, the vibration members 1-*a* and 1-*c* are rotated to generate a push-up vibration at the respective projections, whereas, the vibration members 1-*b* and 1-*d* are not rotated, and elliptical movements are generated at the respective projections.

Here, the reason why the angle is desirably greater than or equal to 45 degrees will be given.

Figure 4B:
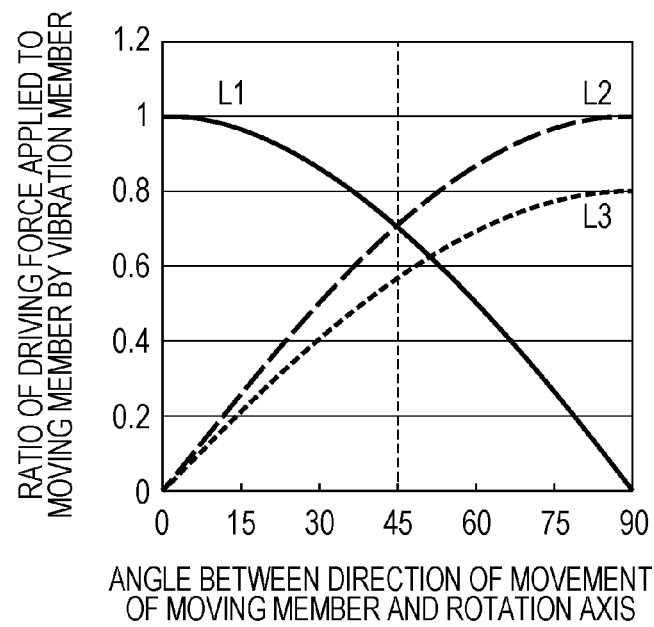

FIG. 4B shows the relationship between the angle between the direction of movement of the moving member and the rotation axis of each vibration member and driving force applied to the moving member by each vibration member.

Ratios are plotted along the vertical axis with the ratio when a maximum force is applied to the moving member by each vibration member being 1.

A curve L1 represents driving force resulting from elliptical movement of the projection of each vibration member and applied to the moving member (hereunder referred to as "P1"). A curve L2 represents driving force resulting from a push-up vibration of the projection of each rotated vibration member and applied to the moving member (hereunder referred to as "P2").

A curve L3 represents driving force resulting from a push-up vibration of the projection of each rotated vibration member and applied to the moving member as with L2 (hereunder referred to as "P3"), and indicates the difference when P3<P2.

As shown in FIG. 4B, P1 becomes a maximum when the angle between the direction of movement of the moving member and the rotation axis of each vibration member is 0 degrees, and P2 becomes a maximum when the angle between the direction of movement of the moving member and the rotation axis of each vibration member is 90 degrees.

These forces balance when the angle between the direction of movement of the moving member and the rotation axis of each vibration member is 45 degrees. Here, if each vibration member is tilted when the angle is 45 degrees, and the driving method is switched, it is possible to maximally make use of the driving force of each vibration member.

The actual driving force resulting from the push-up vibration of each vibration member is less than or equal to the driving force resulting from the elliptical movement. Therefore, it is optimal to switch the driving force resulting from the elliptical movement and the driving force resulting from the push-up vibration at a point where the angle between the direction of movement of the moving member and the rotation axis of each vibration member is greater than 45 degrees, such as an intersection of the curve L1 and the curve L3.

Accordingly, it is desirable to rotate each vibration member when the angle between the direction of movement of the moving member and the rotation axis of each vibration member is greater than or equal to 45 degrees.

In a method of tilting the vibration members in the ranges of the shaded portions shown in FIG. 4A, when, for example, viscosity is provided between each shaft 7 and the base 2, the vibration members can be rotated by a force that is greater than or equal to a predetermined friction force, thereby making it possible to tilt or not to tilt the vibration members.

It is possible to adjust tilting amounts by providing viscosity between the base 2 and the shafts 7.

It is possible to dispose a different actuator at portions where the shafts 7 are connected to the base 2, to tilt the vibration members by driving force of the actuator.

Second Embodiment

In a second embodiment, an exemplary structure of a vibration type driving apparatus, which differs from that of the first embodiment, will be described with reference to FIGS. 5A and 5B.

In the first embodiment, the rotation axes are provided at a side opposite to the side of the vibration members where the projections are formed, whereas, in the second embodiment, rotation axes are provided at the same side of the vibration members where the projections are formed.

Figure 5A:
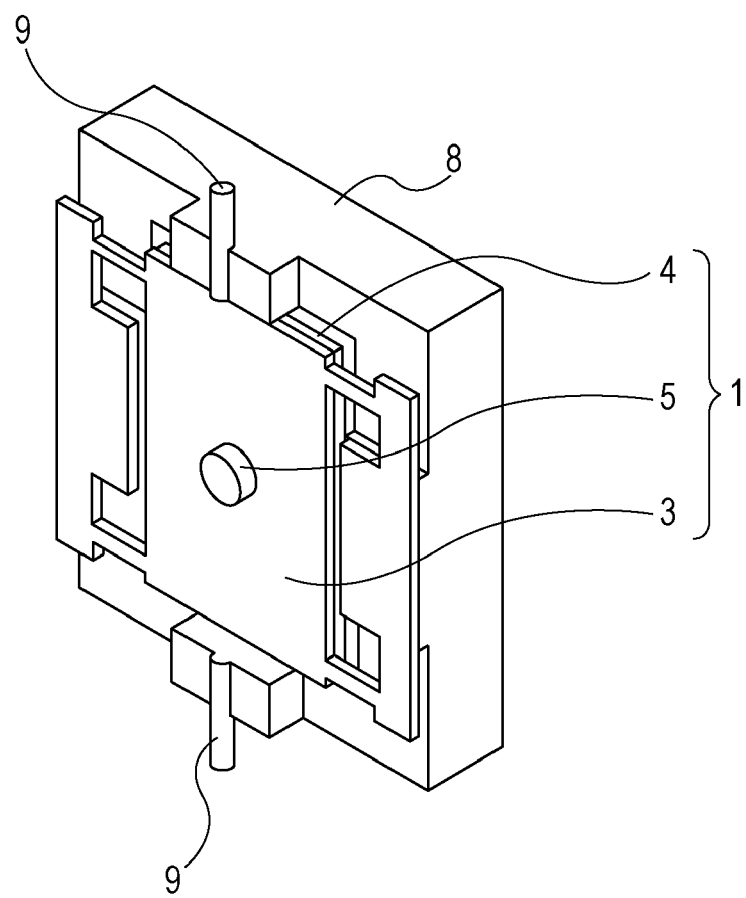
FIGS. 5A and 5B each show the structure of a holding unit and a vibration member of a vibration type driving apparatus in a second embodiment of the present invention.

FIG. 5A is a perspective view of a vibration member and a holding unit thereof in the second embodiment. FIG. 5B is a side view of the vibration member and the holding unit thereof in the second embodiment.

Figure 5B:
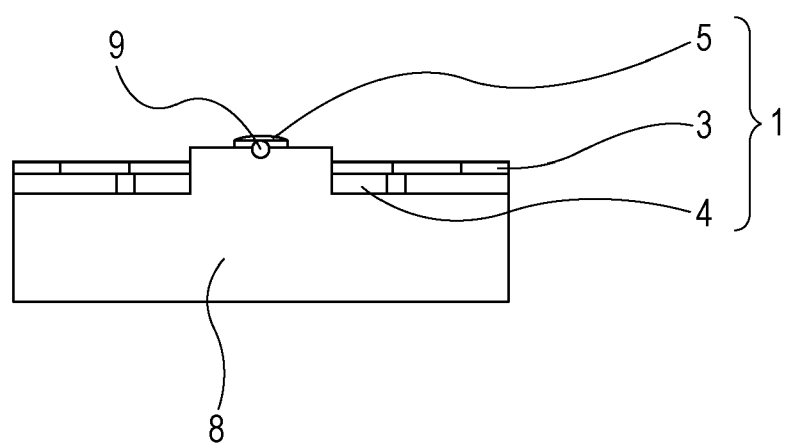

In FIGS. 5A and 5B, a vibration member 1 includes an elastic plate 3, an electro-mechanical energy conversion element 4, and a projection 5.

The vibration member 1 is secured to a vibration-member holding unit 8. The holding unit 8 is connected to a base 2 through a shaft 9. The arrangement of a plurality of the vibration members are as in the first embodiment shown in FIG. 1.

Figure 6:
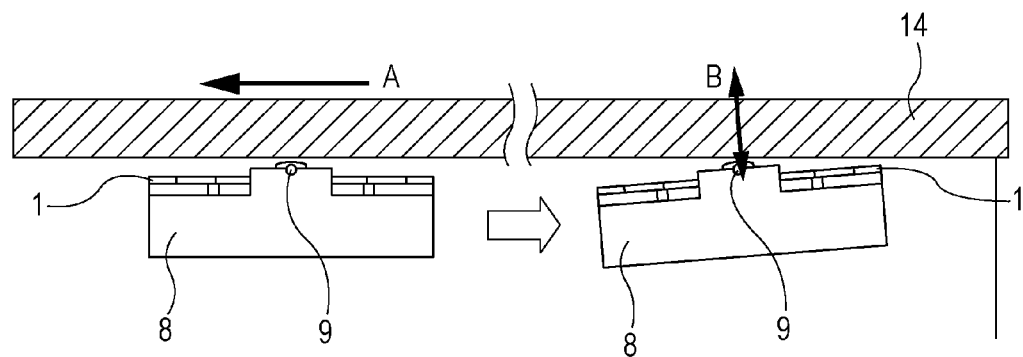
FIG. 6 shows a state of rotation of vibration-member holding units of the vibration type driving apparatus in the second embodiment of the present invention.

In FIG. 6, when a moving member 14 moves in the direction of arrow A, the vibration members 1 and the holding units 6 rotate around the shafts 9, serving as axes, and are tilted by friction force that is generated at contact surfaces between the projections 5 and the moving member 14.

Further, when the aforementioned vibration mode for push-up moving is generated at each vibration member 1 in a tilted state, vibration in the directions of a double-headed arrow B is generated at each projection 5. This vibration strikes the moving member like a woodpecker, thereby making it possible to apply a driving force in the direction of arrow A.

As in the first embodiment, it is desirable for an end of each projection 5 to have an arcuate shape.

Even in this embodiment, as in the first embodiment, it is desirable to, for example, provide viscosity between the base and each shaft 9, so that each vibration member is tilted when an acute angle between a direction of movement of the moving member and each driving shaft is greater than 45 degrees.

As in the first embodiment, it is possible to separately provide an actuator for tilting the vibration members.

In the first embodiment, since the rotation axes are provided at a side opposite to the side of the vibration members where the projections are formed, the displacement amounts of the projections when they are rotated are considerably changed. As a result, contact states when the vibration members are rotated tend to change.

In contrast, in the second embodiment, since the rotation axes are provided at the same side of the vibration members where the projections are formed, it is possible to reduce the displacement amounts of the projections, and to reduce the thickness of the driving apparatus.

Third Embodiment

In a third embodiment, an exemplary structure of a vibration type driving apparatus, which differs from those of the above-described embodiments, will be described with reference to FIGS. 7 to 8B.

Figure 8A:
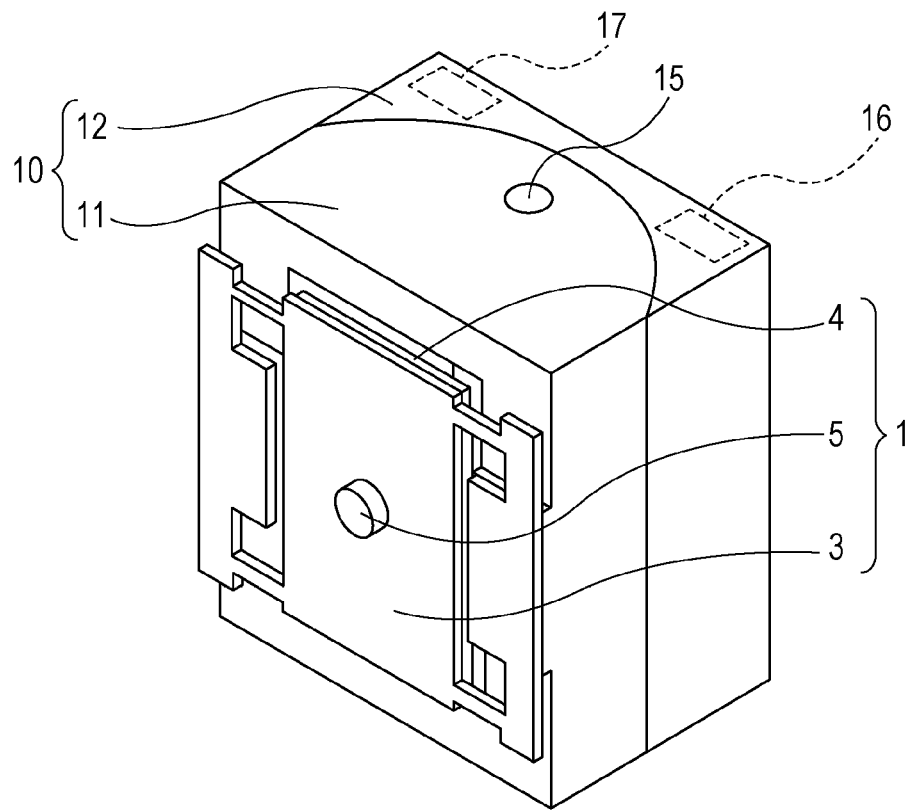
FIGS. 8A and 8B each show the structure of a holding unit and a vibration member of the vibration type driving apparatus in the third embodiment of the present invention.

FIG. 8A is a perspective view of a vibration member and a holding unit thereof in the third embodiment. FIG. 8B is a side view of the vibration member and the holding unit thereof in the third embodiment.

Figure 7:
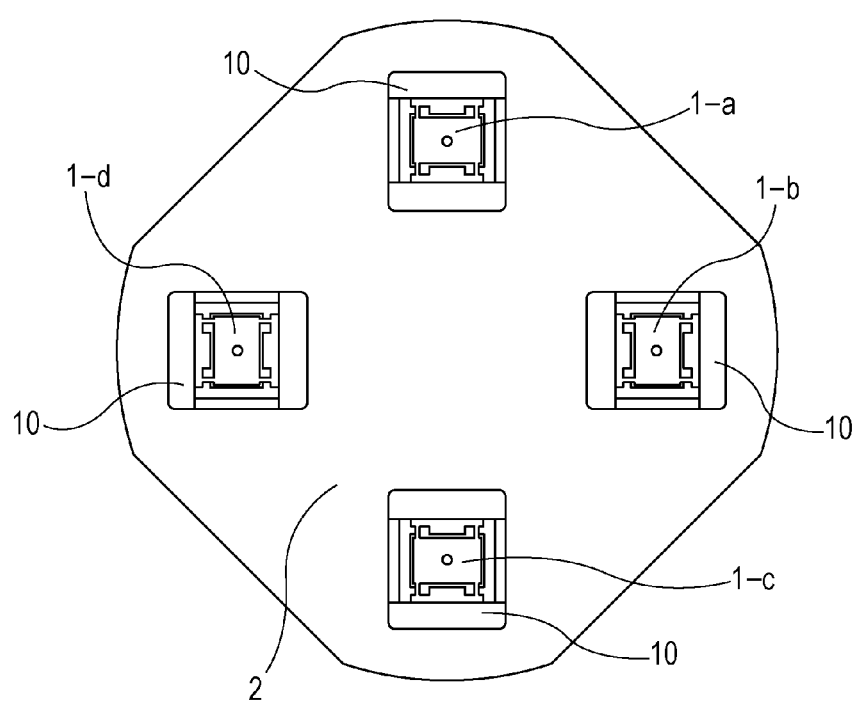
FIG. 7 shows a base and an arrangement of vibration members of a vibration type driving apparatus in a third embodiment of the present invention.

In FIG. 7, vibration members 1-$a$, 1-$b$, 1-$c$, and 1-$d$ correspond to vibration members in the present invention, reference numerals 10 denote vibration-member holding units that hold the vibration members, and reference numeral 2 denotes a base that supports the vibration-member holding units.

Figure 8B:
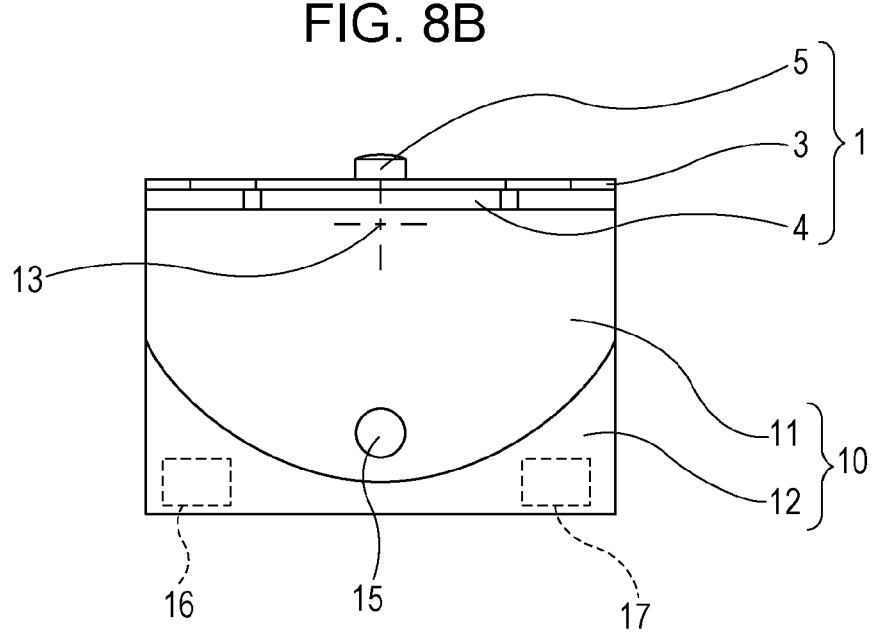

In each of FIGS. 8A and 8B, the vibration member 1 includes an elastic plate 3, an electro-mechanical energy conversion element 4, and a projection 5. The vibration member 1 is secured to the vibration-member holding unit 10.

The vibration-member holding unit 10 includes a vibration-member securing section 11 and a supporting member 12. A surface of the vibration-member securing section 11 that is opposite to a surface thereof where the vibration member 1 is supported has an arcuate shape. The supporting member 12 supports the vibration-member securing section 11 at its arcuate surface. The supporting member 12 is secured to the base 2.

A magnet 15 is adhered to the vicinity of a contact surface between the vibration-member securing section 11 and the supporting member 12. Coils 16 and are secured to an inner portion of the supporting member 12.

A magnetic force is generated by causing electric current to flow in either one of the coil 16 and the coil 17 in accordance with a direction of movement of a moving member 14, so that the vibration member 1 and the vibration-member securing section 11 to which the vibration member 1 is secured rotate around a rotation axis 13.

Although, in the third embodiment, the magnet and coils are used as driving sources for rotating the vibration members, other actuators, such as servo motors, may also be used to tilt the vibration members.

Figure 9A:
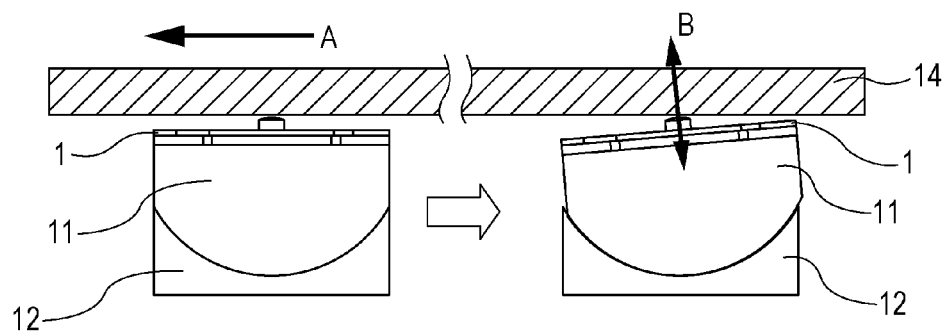
FIG. 9A shows a state of rotation of vibration-member holding units of the vibration type driving apparatus in the third embodiment of the present invention.

In FIG. 9A, when the moving member 14 moves in the direction of arrow A, the vibration members 1 and the vibration-member securing sections 11 are rotated and tilted by actuators.

Then, with the vibration members 1 being tilted, the vibration mode for push-up moving is generated at the vibration members 1, so that vibrations are generated at the projections 5 in the directions of a double-headed arrow B. Further, as in the first embodiment, this vibration strikes the moving member 14 like a woodpecker, thereby making it possible to apply a driving force in the direction of arrow A.

Even in this embodiment, as in the first embodiment, it is desirable for each vibration member to be tilted when an acute angle between the direction of movement of the moving member and each driving axis is greater than 45 degrees. In the third embodiment, the amount of electric current that flows in the coils in accordance with the direction of movement can be controlled.

In the first and second embodiments, the shafts serving as rotation axes are provided at the vibration-member holding units. Due to the sizes of the shafts, the positions where the rotation axes can be placed without interfering with the driving are limited.

In contrast, in the third embodiment, the position of each rotation axis is determined in accordance with a radius of curvature of the arcuate surface of each vibration-member securing section 11 that is opposite to the surface thereof where the corresponding vibration member 1 is held. Therefore, the degrees of freedom with which the centers of the rotation axes are positioned is high. The centers can be brought closer to the contact surfaces between the moving member 14 and the projections 5. Therefore, the stability of the contact states is increased.

In addition, since actuators are used for rotating the vibration members, their angles can be reliably changed to predetermined angles. However, it is necessary to be careful with the positioning of the rotation axes.

Figure 9B:
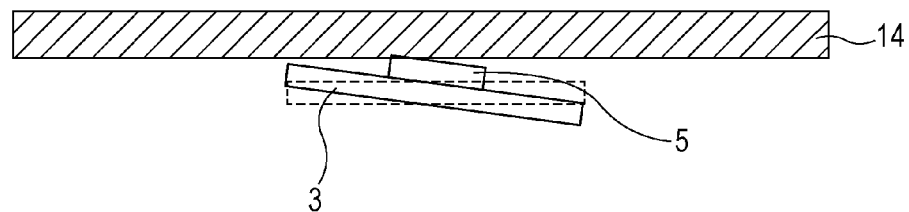
FIG. 9B shows a desirable position of the center of rotation of the vibration-member holding units.

FIG. 9B shows a state in which the vibration member is rotated around the contact surface between the projection 5 and the moving member 14, with the contact surface serving as a rotation axis. When the contact surfaces between the moving member 14 and the projections 5 are set as the rotation axes, ends of the projections 5 are pushed against the surface of the moving member 14. When the rotation axes are situated closer to the moving member than the contact surfaces, the ends of the projections 5 are further pushed against the moving member 14.

Accordingly, it is desirable for the rotation axes of the vibration members to be disposed closer to the vibration members than the contact surfaces between the moving member and the projections.

Fourth Embodiment

In a fourth embodiment, an exemplary structure of a vibration type driving apparatus, which differs from those of the above-described embodiments, will be described with reference to FIGS. 10 to 11B.

Figure 11A:
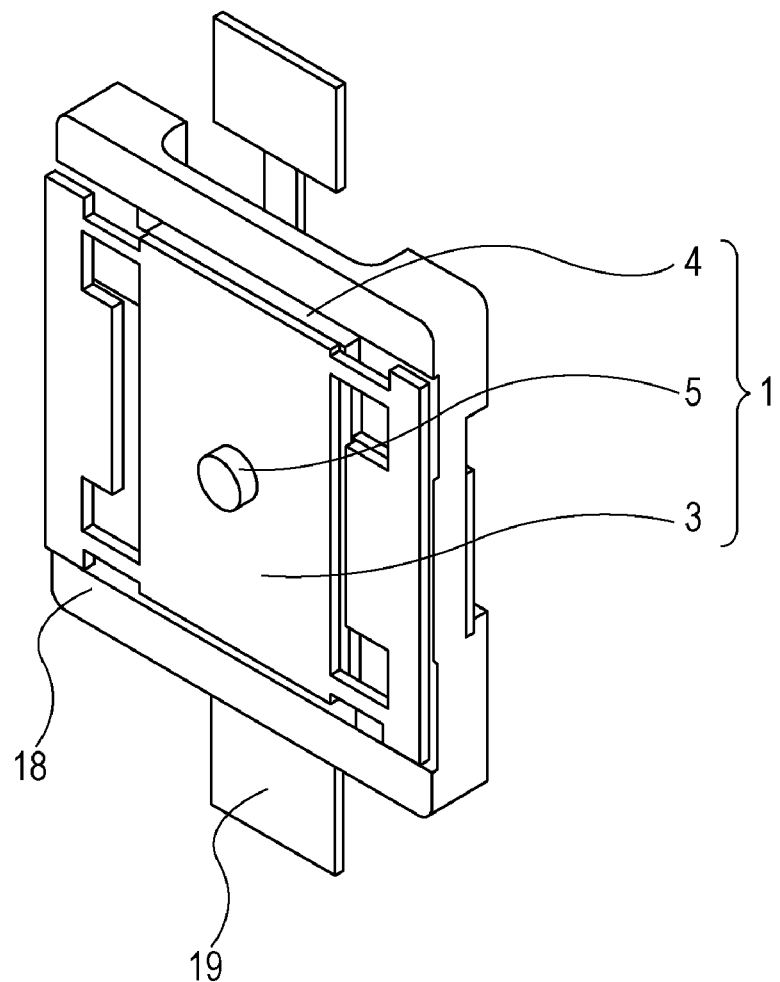
FIGS. 11A and 11B each show the structure of a holding unit and a vibration member of the vibration type driving apparatus in the fourth embodiment of the present invention.

FIG. 11A is a perspective view of a vibration member and a holding unit thereof in the fourth embodiment. FIG. 11B is a side view of the vibration member and the holding unit thereof in the fourth embodiment.

Figure 10:
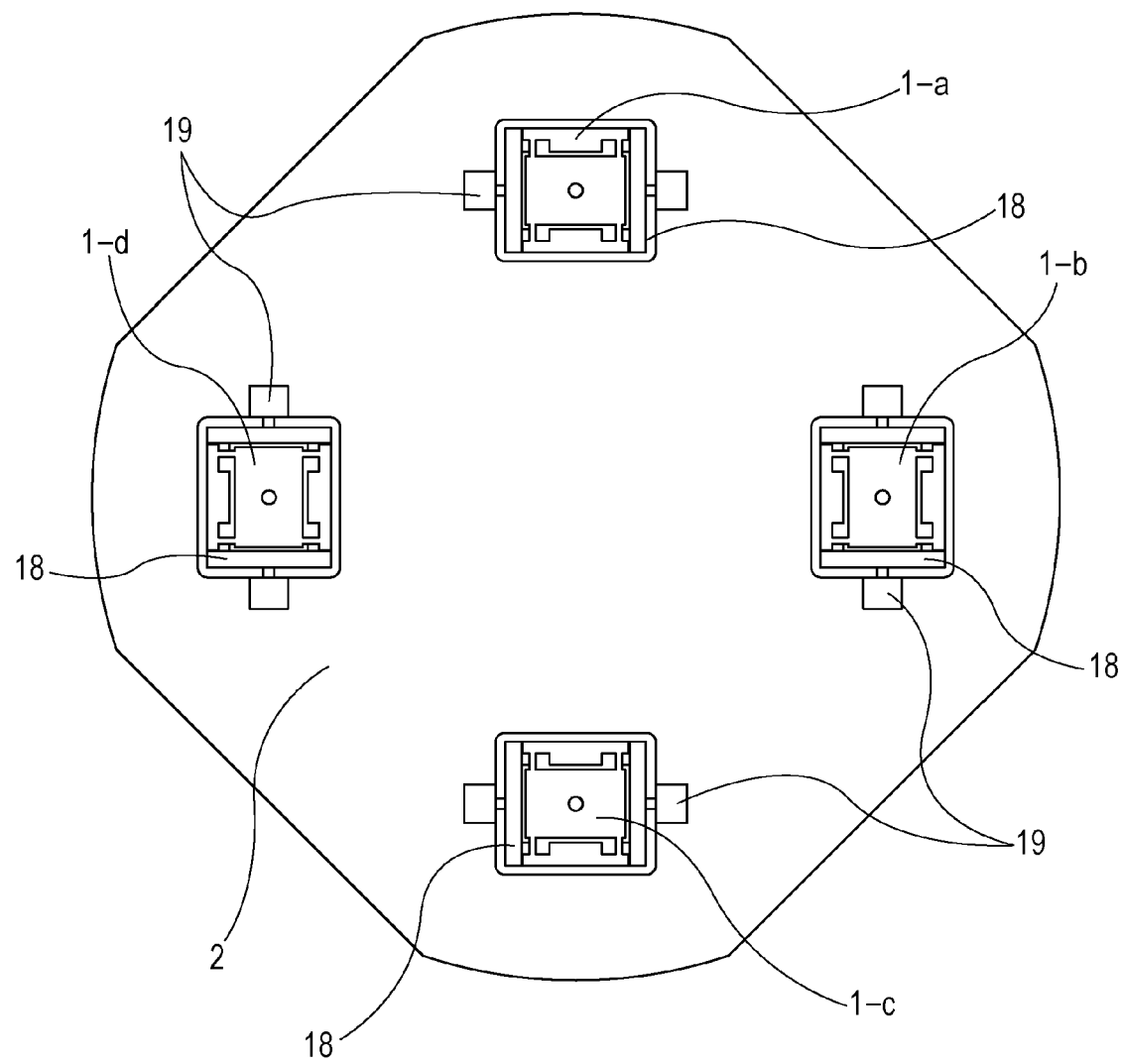
FIG. 10 shows a base and an arrangement of vibration members of a vibration type driving apparatus in a fourth embodiment of the present invention.

In FIG. 10, vibration members 1-$a$, 1-$b$, 1-$c$, and 1-$d$ correspond to vibration members in the present invention, reference numerals 18 denote vibration-member holding units that hold the vibration members, and reference numeral 2 denotes a base. The vibration-member holding units 18 are connected to the base 2 using springs 19.

Figure 11B:
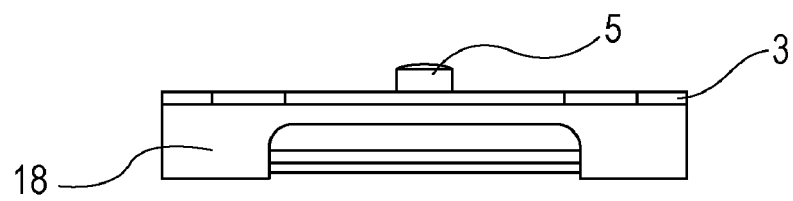

In each of FIGS. 11A and 11B, the vibration member 1 includes an elastic plate 3, an electro-mechanical energy conversion element 4, and a projection 5. The vibration member 1 is secured to the vibration-member holding unit 18.

The vibration-member holding unit 18 is connected to the base 2 using the spring 19.

Figure 12:
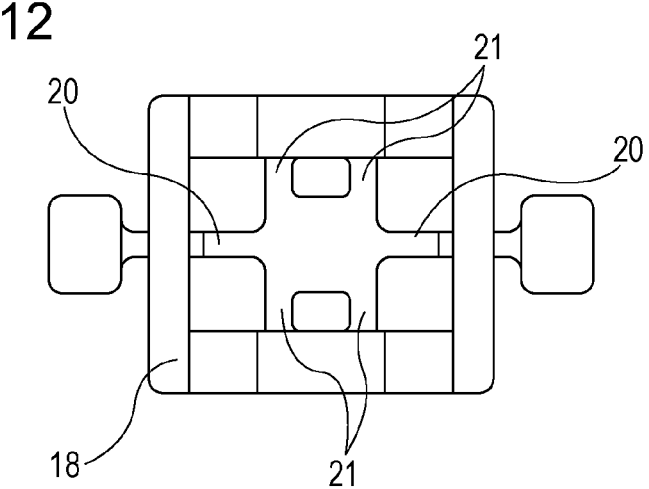
FIG. 12 shows the structure of the holding unit of the vibration type driving apparatus in the fourth embodiment of the present invention.

In FIG. 12, the spring 19 is provided with a rotation beam section 20, connected to the base 2, and a vibration-member-holding beam section 21, connected to the vibration-member holding unit 18. The width and thickness of the rotation beam section 20 are less than those of the vibration-member-holding beam section 21. Therefore, rotation around an axial direction that is parallel to a direction of a force generated by an elliptical movement of the corresponding projection 5 easily occurs, whereas rotation around an axial direction that is perpendicular to the direction of the force does not occur. The driving method for a state in which each vibration member is rotated is similar to those of the other embodiments.

Even in the fourth embodiment, as in the first embodiment, it is desirable that each vibration member be tilted when the acute angle between the direction of movement of the moving member and each driving axis is greater than 45 degrees. It is possible to tilt or not to tilt the vibration members by adjusting spring rigidity.

Although, in the first to third embodiments, thick members, such as shafts or stages, are used as rotation members, in the fourth embodiment, springs that are thin are used as rotation members, so that the apparatus can be made thin and downsized.

Fifth Embodiment

In a fifth embodiment, an exemplary structure of a vibration type driving apparatus, which differs from those of the above-described embodiments, will be described with reference to FIG. 13.

Figure 13:
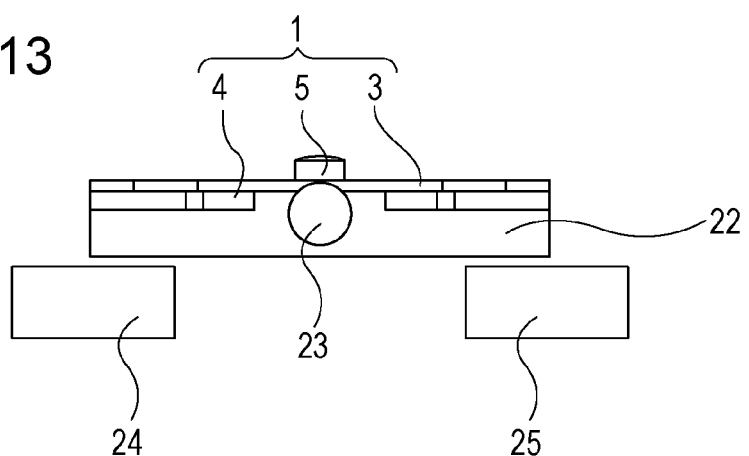
FIG. 13 shows a holding unit and a vibration member of a vibration type driving apparatus in a fifth embodiment of the present invention.

FIG. 13 is a side view of a vibration member and driving sources in the fifth embodiment.

In FIG. 13, the vibration member 1 includes an elastic member 3, an electro-mechanical energy conversion element 4, and a projection 5.

The vibration member 1 is held by a vibration-member holding unit 22 formed of a magnetic material. The vibration-member holding unit 22 is connected to a securing unit 2 through a shaft 23. The shaft 23 is springy, and is restored to a neutral state shown in FIG. 17A.

Electromagnets 24 and 25 are disposed in the vicinity of a surface of the vibration-member holding unit 22 that is opposite to a surface thereof where the vibration member 1 is held.

Figure 14:
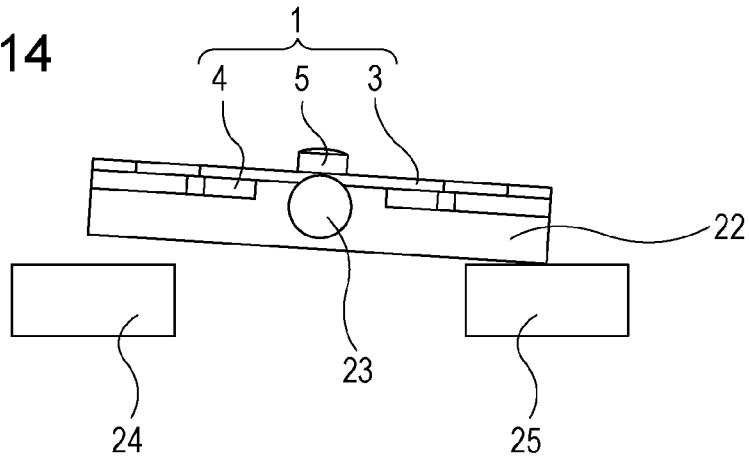
FIG. 14 shows rotation of a vibration-member holding unit of the vibration type driving apparatus in the fifth embodiment of the present invention.

By causing electric current to flow in either one of the electromagnets 24 and 25, a magnetic force is generated in the electromagnet, so that, as shown in FIG. 14, the vibration-member holding unit 22 is attracted to the electromagnet 25, rotates around the shaft 23, and is secured so as to be in contact with the electromagnet 25. Although, in the fifth embodiment, the electromagnets are used, any driving sources, such as electrostatic forces or actuators, may be used as long as they cause the rotated vibration member to contact the securing unit so as to maintain its orientation. A spring may be used instead of the shaft.

The tilting in the direction of movement of the moving member and the behavior during driving correspond to those in the other embodiments.

Although, in the first to fourth embodiments, it is difficult to maintain the orientations of the rotated vibration members, in the fifth embodiment, the orientation of the rotated vibration member can be easily maintained because it is physically stopped.

Sixth Embodiment

In a sixth embodiment, an exemplary structure of a vibration type driving apparatus, which differs from those of the above-described embodiments, will be described with reference to FIG. 15.

Figure 15:
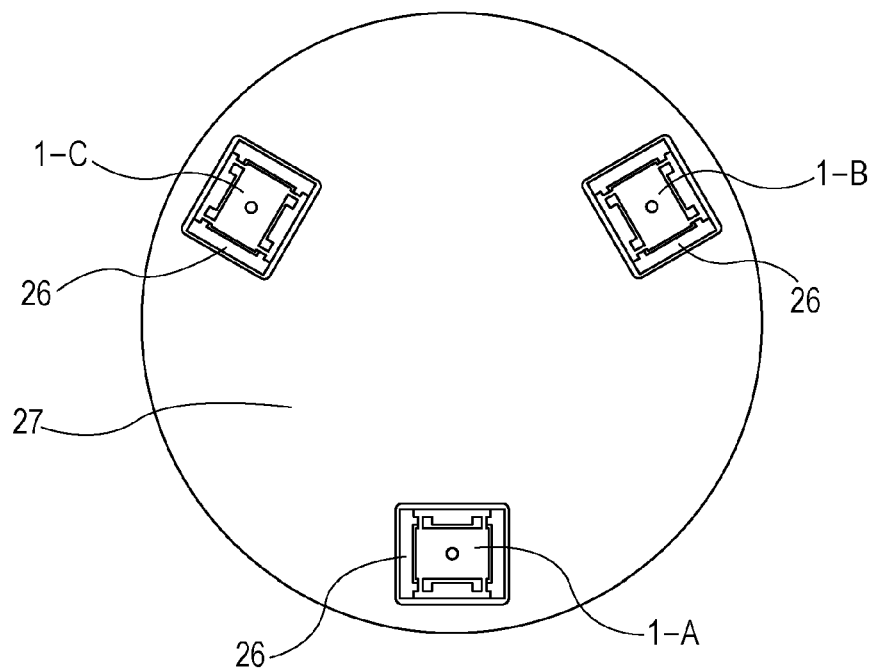
FIG. 15 shows a base and an arrangement of vibration members of a vibration type driving apparatus in a sixth embodiment of the present invention.

In FIG. 15, vibration members 1-A, 1-B, and 1-C correspond to vibration members in the present invention, reference numerals 26 denote vibration-member holding units that hold the vibration members, and reference numeral 27 denotes a triaxial base.

Each vibration-member holding unit 26 includes a mechanism for rotating its corresponding vibration member 1. The mechanism is the same as any one of those discussed in the first to fifth embodiments.

Figure 16:
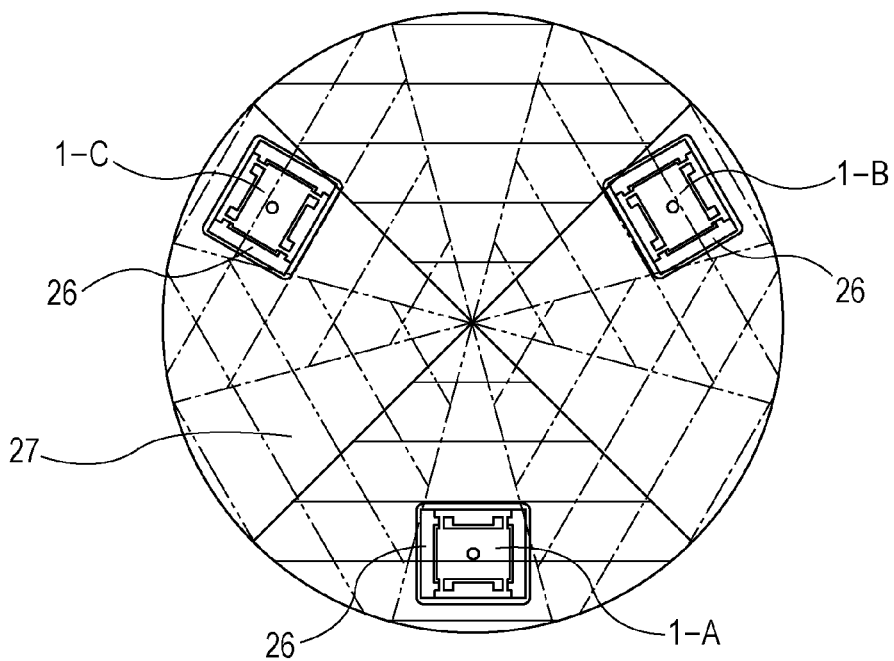
FIG. 16 shows the relationship between rotations of the vibration members and directions of movement of a moving member of the vibration type driving apparatus in the sixth embodiment of the present invention.

In FIG. 16, the vibration member 1-A rotates when an acute angle between a rotation axis and a direction of movement of a moving member is greater than 45 degrees, for example, when, as seen from the center of the base, the moving member (not shown) moves in the direction of an area illustrated by solid lines.

Similarly, when the moving member moves to an area illustrated by alternate long and two short dash lines, the vibration member 1-B rotates, and, when the moving member moves to an area illustrated by alternate long and short dash lines, the vibration member 1-C rotates.

In a portion where two areas overlap each other, the two corresponding vibration members rotate.

Accordingly, even if three vibration members are used, as in the other embodiments, it is possible to rotate the vibration members when the angle between the direction of movement of the moving member and each rotation axis is greater than 45 degrees. The behavior and rotation of each vibration member when the moving member moves are similar to those in the first to fifth embodiments.

In the first to fifth embodiments, power consumption is large because four vibration members are used. However, in the sixth embodiment, power consumption can be reduced because only three vibration members are used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-067003, filed Mar. 23, 2010 which is hereby incorporated by reference herein in its entirety.

What is claimed is:

1. A vibration type driving apparatus comprising:
a plurality of vibration members, each including at least an electro-mechanical energy conversion element and a contact member and being formed so as to be capable of generating an elliptical movement at the corresponding contact member by combining a vibration mode for forward moving and a vibration mode for push-up moving, the vibration mode for forward moving being primarily a vibration that displaces the contact member in a direction parallel to a surface of the corresponding electro-mechanical energy conversion element, the vibration mode for push-up moving being primarily a vibration that displaces the contact member in a direction perpendicular to the surface of the corresponding electro-mechanical energy conversion element, at least two of the plurality of vibration members being disposed at positions where directions of forces generated by the elliptical movements differ from each other, and the elliptical movements causing a moving member in contact with the vibration members through the contact members of the vibration members to move in a plurality of different directions, wherein the plurality of vibration members include rotation units that are formed so as to be rotatable around respective rotation axes that are parallel to the respective directions of the forces generated by the elliptical movements, wherein any vibration member that is positioned in a range where an angle between a direction of movement of the moving member and the corresponding rotation axis is greater than a predetermined angle is tilted by the rotation unit, and the vibration mode for push-up moving is generated at the any vibration member, and wherein the elliptical movement of any vibration member that is positioned in a range where the angle between the direction of movement of the moving member and the corresponding rotation axis is less than the predetermined angle causes the moving member to move.

2. The vibration type driving apparatus according to claim 1,
wherein the any vibration member that is positioned in the range where the angle between the direction of movement of the moving member and the corresponding rotation axis is greater than 45 degrees is tilted by the corresponding rotation unit, and the vibration mode for push-up moving is generated at the any vibration member.

3. The vibration type driving apparatus according to claim 1,
wherein the rotation units are formed so that the rotation axes are rotatable by friction force between the moving member and the contact members of the vibration members.

4. The vibration type driving apparatus according to claim 1,
wherein the rotation units are formed so that the rotation axes are rotatable by a driving unit that drives the rotation axes.

5. The vibration type driving apparatus according to claim 1,
wherein an end of the contact member of each of the vibration members has an arcuate shape.

6. The vibration type driving apparatus according to claim 1,
wherein the rotation axis of each of the vibration members is provided at the corresponding vibration member rather than at a contact surface between the corresponding contact member and the moving member.

7. The vibration type driving apparatus according to claim 5,
wherein a radius of curvature of each of the arcuate shapes is less than or equal to a distance from the corresponding rotation axis to the corresponding contact member.

8. The vibration type driving apparatus according to claim 5,
wherein a radius of curvature of each of the arcuate shapes is equal to a distance from the corresponding rotation axis to the corresponding contact member.

* * * * *